US010207765B2

(12) United States Patent
Wagner

(10) Patent No.: US 10,207,765 B2
(45) Date of Patent: Feb. 19, 2019

(54) BICYCLE FRAME ELEMENT

(71) Applicant: Canyon Bicycles GmbH, Koblenz (DE)

(72) Inventor: Lars Wagner, Muhltal (DE)

(73) Assignee: Canyon Bicycles GmbH, Koblenz (DE)

( * ) Notice: Subject to any disclaimer, the term of this patent is extended or adjusted under 35 U.S.C. 154(b) by 0 days.

(21) Appl. No.: 14/800,923

(22) Filed: Jul. 16, 2015

(65) Prior Publication Data

US 2016/0016632 A1  Jan. 21, 2016

(30) Foreign Application Priority Data

Jul. 17, 2014  (DE) .................... 20 2014 005 836 U

(51) Int. Cl.
*B62K 19/36* (2006.01)
*B62J 1/08* (2006.01)

(52) U.S. Cl.
CPC ................ *B62K 19/36* (2013.01); *B62J 1/08* (2013.01); *B62J 2001/085* (2013.01)

(58) Field of Classification Search
CPC ........ B62J 1/08; B62J 2001/085; B62K 19/36
USPC .................................................... 280/281.1
See application file for complete search history.

(56) References Cited

U.S. PATENT DOCUMENTS

| 2,770,479 | A | * | 11/1956 | Hanns | B62K 19/36 280/281.1 |
| 3,604,734 | A | * | 9/1971 | Friedman | A47B 9/08 108/146 |
| 3,849,008 | A | | 11/1974 | Boucher et al. | |
| 4,417,744 | A | | 11/1983 | Spear | |
| 5,351,980 | A | * | 10/1994 | Huang | B62K 19/36 280/281.1 |
| 2007/0132203 | A1 | | 6/2007 | Yamakoshi | |
| 2011/0042543 | A1 | | 2/2011 | Tseng | |

FOREIGN PATENT DOCUMENTS

| CH | 173959 | A | | 12/1934 | |
| DE | 202007009949 | U1 | | 11/2007 | |
| DE | 202007015382 | U1 | | 1/2008 | |
| FR | 2579948 | A1 | | 10/1986 | |
| FR | 2581952 | A3 | * | 11/1986 | ............. B62K 19/36 |
| FR | 2855489 | A1 | | 12/2004 | |
| JP | 45013547 | Y1 | * | 6/1970 | |
| JP | 4513547 | B2 | | 7/2010 | |
| NL | 8400540 | A | | 9/1985 | |

* cited by examiner

*Primary Examiner* — Kevin Hurley
*Assistant Examiner* — Felicia L. Brittman
(74) *Attorney, Agent, or Firm* — The Webb Law Firm

(57) ABSTRACT

A bicycle frame element has a seat tube (10). A clamping element (20) is arranged in the seat tube (10), on which element a clamping force is exerted by a clamping means (34) to fix a seat post (30) in the seat tube (10). Further, a bearing element (22) for defining the lateral position of the seat post (30) is arranged in the end portion (16) of the seat tube (10), when in the mounted state.

18 Claims, 1 Drawing Sheet

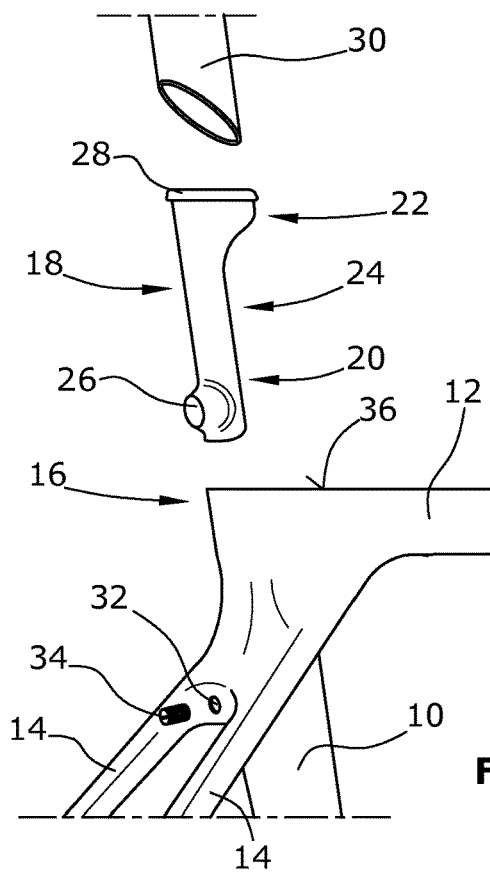
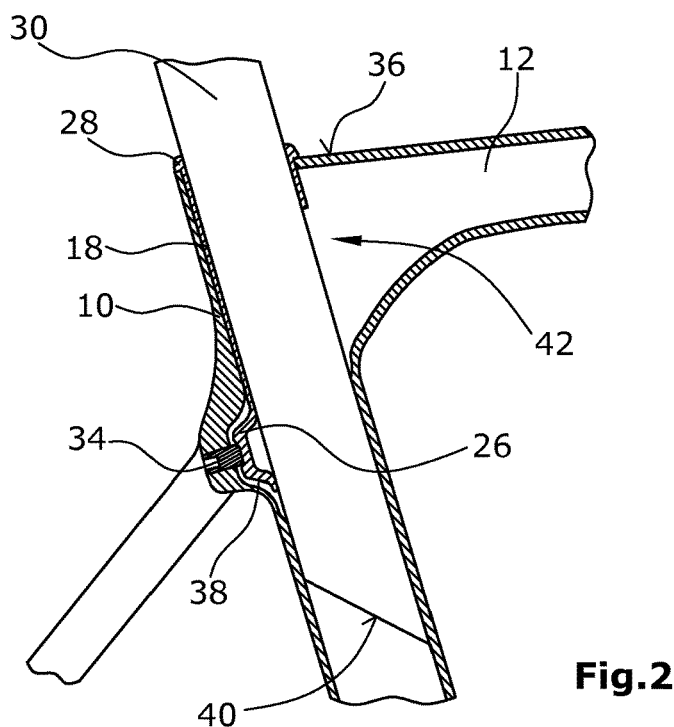

BICYCLE FRAME ELEMENT

CROSS REFERENCE TO RELATED APPLICATION

The present invention claims the priority of German Patent Application no. DE 20 2014 005 836.9 filed on Jul. 17, 2014, the disclosure of which is incorporated herein by reference.

BACKGROUND OF THE INVENTION

Field of the Invention

The invention relates to a bicycle frame element, in particular to a part of a racing bicycle or a triathlon bicycle. The invention further relates to a retaining device for fixing a seat post in the seat tube of a bicycle frame, in particular of such a bicycle frame element. In addition, the invention relates to a bicycle frame.

Description of the prior art

Conventional seat posts are fixed in the seat tube of a bicycle frame by means of a clamp. In this regard, the seat tube has a longitudinal slit in the upper end portion and is surrounded by the clamp. For the fixation of the seat post in the seat tube, it is further known to provide a wedge-like element in the seat tube instead of the seat clamp, which wedge-like element is pressed against the seat post by means of a clamping screw. Thereby, the seat post is clampingly fixed in the seat tube.

SUMMARY OF THE INVENTION

It is an object of the invention to provide a bicycle frame element which allows for an improved clamping of the seat post in the seat tube. Further, it is an object of the invention to provide a corresponding retaining device for fixing the seat post in the seat tube. It is another object of the invention to provide a bicycle frame which preferably comprises such a bicycle frame element.

The object is achieved with a bicycle frame element as defined in claim 1, a retaining device as defined in claim 10, as well as a bicycle frame as defined in claim 15.

The bicycle frame element of the present invention includes a seat tube. In particular, the seat tube is part of a bicycle frame, wherein the seat tube is connected with a top tube and a down tube which in turn are connected with a fork tube, while other frame structures are also known. Further, in frames without suspension, the seat tube is connected with seat stays extending in the direction of the dropout receiving the rear wheel hub. Chain stays that also extend in the direction of the dropout are connected with the seat tube in the region of the bottom bracket housing or with the bottom bracket housing itself. However, the design of the bicycle frame itself is independent of the invention concerning the bicycle frame element which merely is a part of the bicycle frame.

In the bicycle frame element of the present invention a clamping element is arranged inside the seat tube. According to the invention it is provided that, different from a clamp surrounding the seat tube, the clamping element is arranged inside the seat tube. A clamping force is exerted on the clamping element in order to fix a seat post that supports a seat. The clamping force is exerted by a clamping means such as a screw arranged in the seat tube. Specifically, the seat tube has a thread in which the clamping means is arranged. According to the invention, a bearing element is provided in addition, which bearing element is arranged in the end portion of the seat tube for the purpose of defining the lateral position of the seat post in the mounted state. In this case, the end portion of the seat tube is the end of the seat tube that is open to the top into which the seat post is inserted. Owing to the present invention combination of a clamping element arranged inside the seat tube and a bearing element arranged in the end portion of the seat tube, a very reliable fixation of the seat post in the seat tube can be ensured.

Further, it is an essential advantage that the seat post can be bent over a longer section, owing to the fact that the clamping is arranged in the seat tube. The sitting comfort is improved thereby. The length of the bending section of a seat post is defined as the part of the seat post which, in the mounted state, is above the clamping. When compared with a conventional seat post fixed by means of a clamp, arranging the clamping element in the seat tube already results in an extension of the bending length. Since, according to the invention, a bearing element is provided in the end portion of the seat tube, the clamping element can be arranged in particular several centimeters inside the seat tube. It is provided that, measured from a top edge of the seat tube, the clamping element is arranged at least 5 cm, in particular at least 7 cm inside the seat tube. Since, due to the clamping mechanism of the present invention, no more clamp is provided that surrounds the seat tube, it is possible to shorten the sea tube itself. Generally, the seat tube no longer has to protrude beyond the top tube of the bicycle frame. At the end of a top side of a seat tube thus defined, the clamping is arranged preferably 5 cm, in particular 7 cm inside the seat tube. Shortening the seat tube further offers the additional advantage that the part of the seat post, which is outside the seat tube, is longer. Thereby, the bending length is increased and thus the comfort is enhanced.

The clamping element preferably has a protrusion that extends into a recess in the seat tube, when in the mounted state. The recess preferably is not a continuous opening in the seat tube, but an indentation provided in the inner side of the seat tube, into which the protrusion extends. Thereby, in particular the position of the clamping element is defined. Moreover, a clamping element of stronger material may therefore be provided so that the transmission of force is improved.

Preferably, the clamping means has the same effect on the protrusion of the clamping means as the screw, a locking element or the like.

In another preferred embodiment the clamping means is arranged such that it immediately generates a clamping force acting substantially perpendicular to the seat post. Thus, other than with, for instance, a clamp or a wedge, the clamping force is not deflected in order to effect clamping, but it acts directly perpendicular to the seat post. This is advantageous in that no force components are lost. When a force is deflected, always only a part of the force is deflected so that the required force that the clamping means has to exert is greater than the actually required clamping force. With the present invention arrangement of the clamping means such that the clamping force acts directly substantially perpendicular to the seat post, no or only little additional force has to be exerted by the clamping means. In this regard, the additional force is reduced mainly to friction. Such friction occurs, for example, below a screw head. A further reduction of the force required or of the tightening moment required can therefore be achieved by using a grub screw as the clamping means.

Further, it is preferred that the clamping means is arranged in a centre plane of the frame. The centre plane of the frame is the plane that, when the bicycle stands, extends vertically at the centre of the frame, corresponding to an axis of symmetry.

In a further, particularly preferred embodiment the clamping means is arranged between the two seat stays which are in particular rigidly connected with the seat tube or the top tube of the frame. This is advantageous in that an accumulation of material already exists in this area or can easily be provided there. Such an accumulation of material is feasible, in particular, for providing a sufficiently long thread for a screw or another clamping means. Further, the arrangement of the clamping means between the seat stays is advantageous, since, in the preferred embodiment, the clamping means acts on the protrusion of the clamping element and the protrusion preferably extends into a recess or bulge in the seat tube. This recess or bulge may be provided in a simple manner in the region between the two seat stays. This is particularly advantageous, since an accumulation of material exists in this area or can be provided in a simple manner without affecting the aerodynamics and/or the design of the bicycle frame.

The bearing element of the present invention, which is arranged in the end portion of the seat tube in order to define the lateral position of the seat post, may be formed integrally with the bicycle frame. This is possible in particular with fiber-reinforced frames, such as frames of CFRP. Preferably, however, it is an element that is arranged in the end portion of the seat tube. Here, it is particularly preferred that the bearing element is designed as a closed ring. The cross section of the ring is adapted to the cross section of the seat post and may also be oval, for example. Preferably, in the mounted state, the bearing element thus surrounds the seat post.

In particular for the purpose of facilitating the assembly and for a clear definition of the position, it is preferred that the bearing element has protrusions which, in the mounted state, rest on an end face of the seat tube. In particular, a circumferential collar is provided instead of one or a plurality of protrusions, the collar being in surface contact with the end face of the seat tube. Thereby, the risk of the intrusion of dirt and humidity into the seat tube is reduced and, further, the position of the bearing element is clearly defined.

The inner dimensions, in particular the inner diameter of the bearing element preferably corresponds substantially to the outer dimensions of the seat post. It is preferred that, in the mounted state, a gap on the order of 0-0.5 mm exists between the outer side of the seat post and the inner side of the bearing element.

In a particularly preferred embodiment the clamping element is connected with the bearing element via a connecting web. In particular, it is an integrally formed part. The same is preferably made of plastic material, in particular thermoplastic material.

The connection of the clamping element with the bearing element via a connecting web, especially in case of an integral design, further facilitates assembly, since it is not required to mount two separate components. Further, it is possible to automatically also define the position of the clamping element through the definition of the bearing element position, and vice versa.

The invention further relates to a retaining device for fixing a seat post in a seat tube of a bicycle frame. The retaining device is an invention independent of the above described bicycle frame element, it being particularly preferred to provide the retaining device in particular in the above bicycle frame element. The retaining device comprises the clamping element and the bearing element as described above with respect to the bicycle frame element. In particular, the clamping element thus comprises the above described protrusion, and the bearing element comprises the collar specifically described above. It is particularly preferred that the retaining device has a connecting web by which the clamping element is connected with the bearing element and by which it is formed in particular as an integral part. The retaining device, which in a particularly preferred embodiment is an integrally formed part, is thus developed in an advantageous manner as described above with respect to the bicycle frame element.

A further independent development relates to a bicycle frame. The bicycle frame has a seat tube and a top tube connected with the seat tube. Depending on the design of the bicycle frame, a down tube is further provided, wherein the top tube and the down tube possibly may be connected by a fork tube. Moreover, depending on whether the bicycle has a suspension or not, seat stays or chain stays are connected directly or indirectly with the seat tube, the top tube or the down tube. The seat tube and the top tube are the components of the bicycle frame that are essential to the invention. Typically, these two components are tubular components of, for instance, circular or oval cross section, or even another, in particular aerodynamic profile. Especially with bicycle frames of fiber-reinforced plastic material such as CFPR or carbon, the connection or joint region between the seat tube and the top tube is problematic with respect to the fiber orientation and the necessary absorption of force, as well as to the rigidity. In the bicycle frame of the present invention, an opening is provided between seat tube and the top tube. The opening preferably has the inner cross section of the top tube in the transition region between the seat tube and the top tube. Thereby, it is possible to design the fiber orientation in an advantageous manner.

Such an opening between the seat tube and the top tube is an invention that is generally independent of the above described retaining device for the seat post. By providing such a retaining element that comprises a clamping element and a bearing element, it is possible to arrange the clamping element directly in the seat tube such that it is arranged below the opening between the seat tube and the top tube. As described above, the bearing element is provided in the end portion of the seat tube, i.e. above the opening between the sea tube and the top tube.

Therefore, it is most preferred to provide a bicycle frame in combination with a retaining device for fixing a seat post as described above.

BRIEF DESCRIPTION OF THE DRAWINGS

A full and enabling disclosure of the present invention, enabling one of ordinary skill in the art to carry out the invention, is set forth in greater detail in the following description, including reference to the accompanying drawing in which FIG. 1 is a schematic perspective view of a bicycle frame, an integral retaining device, as well as a seat post in a non-assembled state, and FIG. 2 is a schematic sectional view of the components illustrated in FIG. 1 in the assembled state.

DESCRIPTION OF PREFERRED EMBODIMENTS

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein.

FIG. 1 illustrates a detail of a bicycle frame. The Figure shows a part of a seat tube 10 that is connected with a top tube 12. Further, seat stays 14 are illustrated which, on the one hand, pass the seat tube 10 on either side thereof and are connected with the top tube and which, on the other hand, are also connected with the seat tube 10. The bicycle frame illustrated specifically is a carbon frame. An end portion 16 of the seat tube 10 ends flush with the top tube or does not or only slightly protrude beyond the top of the top tube.

A retaining device 18 designed as an integrally formed part comprises a clamping element 20, a bearing element 22, as well as a connecting web 24 connecting the clamping element 20 with the bearing element 22. The clamping element has a protrusion 26 which in the embodiment illustrated is of a frustoconical shape.

In the embodiment illustrated, the bearing element 22 is of annular shape and comprises a collar 28 that protrudes radially outward.

Further, the exploded view in FIG. 1 shows a lower end of a seat post 30.

An accumulation of material is provided between the two seat stays 14, in which accumulation of material a threaded bore 32 is formed. A clamping means 34 may be screwed into this threaded bore 32, the screw being realized as a grub screw in the embodiment illustrated.

For assembly, the retaining device 18 which is designed as an integrally formed part in the embodiment illustrated, is inserted into the seat post 10 until the collar 28 rests on an end face 36 of the seat tube 10. In this position the protrusion 26 of the clamping element 20 protrudes into a recess 38 in the seat tube 10. In the embodiment illustrated, the recess 38 is designed as an indentation in the inner side of the seat tube 10. The recess 38 is arranged between the two seat stays 14, since an accumulation of material may also be provided in this region or is already provided for reasons of stability.

Thereafter, the seat post 30 is inserted into the bearing element 22, which in the embodiment illustrated is of annular shape, until a lower end 40 of the seat post 30 is arranged below the clamping element 20. Then, the seat post 30 may be fixed in the seat tube 10 in a simple manner by screwing in the clamping means 34 designed as a grub screw. Already at a low torque a sufficient force is exerted by the grub screw 34 on the protrusion 26 of the clamping element 20 so that a sufficient fixation of the seat post 30 in the seat tube 10 is ensured already at a comparatively low force.

In particular when the retaining device 18 of the present invention is used, it is possible to design a bicycle frame such that an opening 42 is formed between the seat tube 10 and the top tube 12. Here, the opening 42 preferably has an inner cross section corresponding to that of the entire top tube in the region of the connection of the top tube 12 and the seat tube 10. Thereby, it is possible to achieve an advantageous fiber orientation, in particular with carbon frames. It is possible to provide the opening 42, since the seat tube is clamped, on the one hand, below the opening 42 by the clamping element 20 in combination with the clamping means 34 and, on the other hand, is retained above the opening 42 by the bearing element 22 for the definition of the lateral position of the seat post 30.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A bicycle frame element comprising:
   a seat tube,
   a clamping element arranged in the seat tube, on which element a clamping force substantially perpendicular to a seat post is exerted by a clamp to fix the seat post in the seat tube, the clamp being arranged in the seat tube, and
   a bearing element for defining the lateral position of the seat post, the bearing element being arranged in an end portion of the seat tube,
   wherein the clamping element comprises a protrusion which, in a mounted state, protrudes into a recess of the seat tube in a direction of the clamping force, the clamp acting on the protrusion,
   wherein the recess defines an indentation or a hole extending in the direction of the clamping force in order to define a position of the clamping element, and
   wherein vertical and horizontal movement of the clamping element is restricted by the recess in the position of the clamping element defined by the indentation or the hole.

2. The bicycle frame element of claim 1, wherein the clamp immediately generates a clamping force acting substantially perpendicular to the seat post.

3. The bicycle frame element of claim 1, wherein the clamp is arranged in a frame center plane.

4. The bicycle frame element of claim 1, wherein the bearing element is formed in a closed, annular shape so as to surround the seat post when in a mounted state.

5. The bicycle frame element of claim 1, wherein the bearing element has a collar resting on an end face of the seat tube when in a mounted state.

6. The bicycle frame element of claim 1, wherein an inner dimension of the bearing element substantially corresponds to an outer dimension of the seat post.

7. The bicycle frame element of claim 1, wherein the clamping element is connected with the bearing element via a connecting web, the clamping element and the bearing element being formed as an integral retaining device.

8. The bicycle frame element of claim 1, wherein the clamp comprises a screw exerting a force on the clamping element.

9. The bicycle frame element of claim 1, wherein the recess encloses the protrusion of the clamping element.

10. A retaining device for fixing a seat post in a seat tube of a bicycle frame, the retaining device comprising:
    a clamping element adapted to be arranged in the seat tube, on which element a clamping force substantially perpendicular to a seat post is exerted by a clamp to fix the seat-post in the seat tube, the clamp being adapted to be arranged in the seat tube, and
    a bearing element for defining the lateral position of the seat post, the bearing element being adapted to be arranged in an end portion of the seat tube, wherein the clamping element comprises a protrusion which, in a mounted state, protrudes into a recess of the seat tube in a direction of the clamping force, the clamp acting on the protrusion, wherein the recess defines an indentation or a hole extending in the direction of the clamping force in order to define a position of the clamping element, and wherein vertical and horizontal movement of the clamping element is restricted by the recess in the position of the clamping element defined by the indentation or the hole.

11. The retaining device of claim 10, wherein the bearing element is formed in a closed, annular shape so as to surround the seat post when in a mounted state.

12. The retaining device of claim 10, wherein the bearing element has a collar resting on an end face of the seat tube when in a mounted state.

13. The retaining device of claim 10, wherein the clamping element is connected with the bearing element via a connecting web, the clamping element and the bearing element being formed as an integral retaining device.

14. The retaining device of claim 10, where the clamp comprises a screw exerting a force on the clamping element.

15. The retaining device of claim 10, wherein the recess encloses the protrusion of the clamping element.

16. A bicycle frame comprising a seat tube and a top tube connected with the seat tube, the seat tube having an opening directed into the top tube, wherein the seat tube is designed to receive a retaining device for fixing a seat post in the seat tube, wherein the retaining device comprises:

a clamping element adapted to be arranged in the seat tube, on which element a clamping force substantially perpendicular to a seat post is exerted by a clamp to fix the seat-post in the seat tube, the clamp being adapted to be arranged in the seat tube, and a bearing element for defining the lateral position of the seat post, the bearing element being adapted to be arranged in an end portion of the seat tube, wherein the clamping element comprises a protrusion which, in a mounted state, protrudes into a recess of the seat tube in a direction of the clamping force, the clamp acting on the protrusion, wherein the recess defines an indentation or a hole extending in the direction of the clamping force in order to define a position of the clamping element, and wherein vertical and horizontal movement of the clamping element is restricted by the recess in the position of the clamping element defined by the indentation or the hole.

17. The bicycle frame of claim 16, wherein the opening has an inner cross section of the top tube in a transition region between the seat tube and the top tube.

18. The retaining device of claim 16, wherein the recess encloses the protrusion of the clamping element.

* * * * *